Patented Apr. 15, 1930

1,754,521

UNITED STATES PATENT OFFICE

ELIZABETH M. MEYER, OF NEW YORK, N. Y.

SOLUBLE ALBUMIN AND PROCESS OF PRODUCING IT

No Drawing.  Application filed October 20, 1925. Serial No. 63,766.

This invention relates to water soluble albumin and is herein described as applied to the preparation of water soluble albumin from commercial milk-casein. It has been usually supposed that, in order to produce a product suitable for food purposes, the casein had to be dissolved by the aid of an alkali or other powerful chemicals in order to produce an alkaline albuminate. Other methods have been proposed.

According to the present invention the use of powerful chemicals is avoided, and an edible product is obtained which may be in such a form that it may be beaten to form a foam or froth like white of egg albumin.

Other features and advantages will hereinafter appear.

For a source of curde albumin many kinds of casein may be used, but where an edible product is desired it is usually preferable to use a finely granular milk-casein which has been precipitated by acetic acid or any other acid commercially employed for this purpose and which has not been used in substantial excess. Such casein is a commercial product on the market in granular form. I have found that it is not an easy matter to remove the acid adsorbed by such casein. The acid can, however, be removed by prolonged washing, as with tap water. It is not sufficient to test the wash water for acid, but a small part of the material which is being washed should be tested, and the washing continued until the casein is preferably absolutely neutral to litmus. This thoroughly washed product may then be dried and stored for future treatment. Drying, however, is not necessary. With some kinds of casein, however, and particularly when the process hereinafter described is to be used in the making of some inedible product, such as veneer glue or a textile finishing compound, then the washing of the casein need not be carried to the same extent as is desirable when the product of my process is intended for food purposes.

I obtained the best product when I mixed 25 to 30 parts by weight of this wet washed casein with about 85 parts of freshly prepared lime suspension. The suspension was prepared by slaking two pounds of selected fat quicklime with one pound of water, and the lime thus slaked was mixed with water and with this was stirred the 25 to 30 parts of the washed wet casein, equivalent to about 10 to 15 parts of such casein after it had been dried. Preferably part of the water was mixed with the casein and part with the slaked lime, and the whole mixed to make 100 parts water and three parts lime by weight. The lime suspension of the casein was stirred briskly for a few minutes and then allowed to settle for a few hours. Other experiments indicated that prolonged stirring, and that a second stirring after settling had begun, were both inadvisable. At the end of the settling a substantially clear solution was obtained. By "substantially clear," I mean a solution substantially free of suspended particles. This solution, which may be separated from the suspended material in any suitable manner, such as by the use of strainers, filters or mechanical separators may be used for some purposes as a source of soluble albumin. A suitable concentration can be beaten with an egg beater to form a stiff froth. The albumin is coagulable by heat. For an edible product, however, it is preferably treated as follows:

To obtain a dry soluble albumin the substantially clear solution was put in shallow trays and dried at a temperature not exceeding 125° F. to form an almost white or creamy white flake, opaque but semitranslucent. After the solution had completely dried the resulting flakes were found to be not quite completely soluble. In order to further increase the solubility of the albumin and to remove nitrogenous gas thereby assuring improved keeping properties and freedom from odor, these flakes were mixed with dibasic calcium phosphate, such as is sold on the market under the name of reverted or bone phosphate. The phosphate was used in the form of an exceedingly fine powder. Other tests indicated that to obtain the best product the phosphate should be in the form of a very fine powder and free from acids and that the flakes should be shaken down and packed tight in it preferably in opaque boxes. After storage, usually for some days, depending upon the state of the flakes, the flakes were separated from the phosphate by sifting through a fine mesh sieve which retained the flakes of albumin. It is obvious from the method of preparing the product as described that but comparatively small amounts of a mineral salt will be present in the final product.

The final flake product thus obtained was then found to be substantially soluble in water, usually with a very slight alkalinity, and responded to many of the tests for egg albumin, its solution forming a stiff froth when beaten with an egg beater, being coagulable by heat and serving well to replace egg albumin in the food materials used to make cooked products such as cake. Any nitrogenous odors were removed from the flake material by the step of storing it in phosphate powder.

It has been found that the best product is obtained when the above amount of lime suspension is used. Sufficient lime should be used to leave a substantially clear solution. Any material excess of lime has a deleterious effect. Quick drying of the flakes produces the best final results, a reduced amount of water, however, will rather prevent quick drying to a flake than promote it. Of course, any approved method of drying commercial dehydrated white of egg is applicable to the drying of the albumin, bearing in mind that regulation of temperature and proper ventilation is essential to prevent baking or coagulation. According to the method of drying employed, the dry albumin obtained may be in flake, granular, shredded, powder, or other form; the drying in flake form being preferred mainly because it produces the albumin in a suitable form for packing with a phosphate and separating therefrom as hereinbefore described. It is found that some other phosphates may be used instead of the dibasic phosphate named above, but the practicably insoluble phosphates appear to be the best material for the purpose in hand. It will be understood, however, that treatment of the albumin with a phosphate may be omitted if desired.

Having thus described certain embodiments of my invention what I claim is:

1. The process of preparing water-soluble albumin which consists in agitating a thoroughly washed milk casein in a large amount of water containing a low percentage of suspended hydrate of lime, and separating the settleable material from the residual substantially clear solution.

2. The process of preparing water-soluble albumin which consists in agitating a thoroughly washed milk casein in a large amount of water containing about three per centum (3%) of suspended hydrate of lime, and separating the settleable material from the residual substantially clear solution.

3. The process of preparing a water soluble albumin which consists in agitating a thoroughly washed milk casein in a large amount of suspended hydrate of lime, separating the settleable material, and evaporating the residual substantially clear solution to produce an albuminous product.

4. The process of preparing a water soluble albumin which consists in washing an acid-precipitated milk casein with water to completely remove acid, mixing the washed casein with a suspension of hydrate of lime, separating the settleable material, and evaporating the resulting solution.

5. The process of preparing a water soluble albumin which consists in agitating a thoroughly washed milk casein in a large amount of suspended hydrate of lime, separating the settleable material, evaporating the residual substantially clear solution to produce an albuminous product, storing said product in a phosphate powder, and separating the phosphate and albuminous product after storage together.

6. The process of preparing a water soluble albumin which consists in washing an acid-precipitated milk casein with water to completely remove acid, mixing the washed casein with a suspension of hydrate of lime, separating the settleable material, evaporating the resulting solution to produce a flake, storing the flake in a phosphate powder, and separating the phosphate and flake after storage together.

7. The process of preparing a water soluble albumin which consists in agitating a thoroughly washed milk casein in a large amount of suspended hydrate of lime, separating the settleable hydrate of lime, evaporating the residual substantially clear solution to produce an albuminous product packing the product in a dibasic calcium phosphate and separating the phosphate and albuminous product after storage together.

8. The process of preparing a water-soluble albumin which consists in washing an acid-precipitated milk casein with water to completely remove acid, mixing the washed casein with a suspension of hydrate of lime, separating the hydrate, evaporating the resulting solution to produce a flake, packing the flake in a dibasic phosphate powder, and separating the phosphate and flake after storage.

9. The process of preparing water soluble albumin which comprises removing adsorbed acid from milk casein by repeated washings with water, agitating the washed casein with approximately ten times its weight of water containing about three per cent. by weight of lime, settling the mixture and separating the settleable material from the residual substantially clear solution.

In testimony whereof, I have affixed my signature to this specification.

ELIZABETH M. MEYER.